(12) United States Patent
Li

(10) Patent No.: US 10,609,552 B2
(45) Date of Patent: *Mar. 31, 2020

(54) SYSTEM AND METHOD FOR DATA COMMUNICATION PROTECTION

(71) Applicant: TENDYRON CORPORATION, Beijing (CN)

(72) Inventor: Ming Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/314,007

(22) PCT Filed: Aug. 4, 2017

(86) PCT No.: PCT/CN2017/096025
§ 371 (c)(1),
(2) Date: Dec. 28, 2018

(87) PCT Pub. No.: WO2018/024250
PCT Pub. Date: Feb. 8, 2018

(65) Prior Publication Data
US 2019/0342751 A1    Nov. 7, 2019

(30) Foreign Application Priority Data

Aug. 5, 2016 (CN) .......................... 2016 1 0639441
Aug. 5, 2016 (CN) .......................... 2016 1 0640015

(51) Int. Cl.
*H04W 12/00* (2009.01)
*H04W 4/80* (2018.01)
(Continued)

(52) U.S. Cl.
CPC ...... *H04W 12/003* (2019.01); *G06K 7/10366* (2013.01); *H04L 63/0428* (2013.01);
(Continued)

(58) Field of Classification Search
CPC ..... H04L 9/3271; G06K 7/0008; G06Q 20/02
(Continued)

(56) References Cited

U.S. PATENT DOCUMENTS

2007/0106892 A1* 5/2007 Engberg ................. G06Q 20/02
                                                              713/168
2007/0118483 A1* 5/2007 Hill ....................... G06K 7/0008
                                                              705/64
(Continued)

FOREIGN PATENT DOCUMENTS

CN          1936917         3/2007
CN          103227816       7/2013
(Continued)

OTHER PUBLICATIONS

WIPO, English Translation of the ISR and WO for PCT/CN2017/096025, Nov. 3, 2017.

*Primary Examiner* — Bryan F Wright
(74) *Attorney, Agent, or Firm* — Hodgson Russ LLP

(57) ABSTRACT

The present disclosure provides a data communication method and system. The method includes: a first terminal transmitting first data to a second terminal, and starting timing from a time point when finishing transmitting the first data, the first data at least comprising data to be processed; the second terminal receiving the first data, and starting timing from a time point when finishing receiving the first data; when a value obtained by the second terminal from the timing reaches a preset value, the second terminal transmitting second data to the first terminal, the second data being data obtained by the second terminal performing data processing on the data to be processed; and when a value obtained by the first terminal from the timing is in a valid range of the preset value or reaches the preset value, the first terminal allowing to start receiving the second data.

20 Claims, 4 Drawing Sheets

(51) Int. Cl.
   *H04W 12/04*   (2009.01)
   *G06K 7/10*    (2006.01)
   *H04L 29/06*   (2006.01)
   *H04L 9/32*    (2006.01)

(52) U.S. Cl.
   CPC ........... *H04L 63/0869* (2013.01); *H04W 4/80* (2018.02); *H04W 12/0401* (2019.01); *H04L 9/3271* (2013.01)

(58) Field of Classification Search
   USPC .......................................................... 726/7
   See application file for complete search history.

(56) References Cited

U.S. PATENT DOCUMENTS

2010/0295664 A1* 11/2010 Kim .................. H04L 9/3271
                                                340/10.41
2012/0249296 A1* 10/2012 Savry ................ G06K 7/0008
                                                 340/5.65
2013/0136046 A1   5/2013 Wurm et al.

FOREIGN PATENT DOCUMENTS

| | | |
|---|---|---|
| CN | 104754501 | 7/2015 |
| CN | 104915616 | 9/2015 |
| WO | 2014062623 | 4/2014 |

* cited by examiner

SYSTEM AND METHOD FOR DATA COMMUNICATION PROTECTION

CROSS REFERENCE TO RELATED APPLICATIONS

This application is a U.S. national phase application of International Application No. PCT/CN2017/096025, filed on Aug. 4, 2017, which is based on and claims priority to Chinese Patent Application No. 201610640015.3, filed on Aug. 5, 2016, and Chinese Patent Application No. 201610639441.5, filed on Aug. 5, 2016, the entire contents of which are incorporated herein by reference.

FIELD

The present disclosure relates to the field of electronic technology, and more particularly, to a data communication method and a data communication system.

BACKGROUND

At present, in the related art, terminals using a non-contact card reading method are based on protocols such as ISO14443 and ISO15693 for data transmission. Taking the card reading process between the card reader and the smart card as an example, based on the above protocol, during the card reading process of the card reader and the smart card, after the card reader transmits the command data, there will be a frame waiting time (FWT), indicating the maximum time range that the card reader is permitted to wait to receive the smart card response data. That is to say, after the card reader transmits an instruction to the smart card, the card reader waits to receive the response data of the smart card. As long as the data is returned within the frame waiting time (FWT), the card reader will receive it.

Regarding the existing smart card communication protocol, the following problems may exist: for the card reading process, as illustrated in FIG. 1, the merchant card reader transmits the data to the user smart card under normal circumstances, and the user smart card begins to respond and process the data after receiving the data (the time to process the data is t1). After the processing is finished, the response data is immediately transmitted to the merchant card reader, ignoring a tiny time on the line transmission (the order of magnitude of the tiny time is small, and ignoring the tiny time makes it easy to simplify calculations). Therefore, the time required for the merchant card reader from finishing transmitting data to receiving the data fed back by the user smart card is T1=t1. If there is a hacker to perform a man-in-the-middle attack, as illustrated in FIG. 2, the man-in-middle smart card hijacks the request data of the merchant card reader, and forwards the data transmitted by the merchant card reader to the man-in-middle card reader. The man-in-middle card reader may tamper with the request data and transmit the tampered data to the user smart card (the time period from the man-in-middle smart card hijacking the request data of the merchant card reader to the man-in-middle card reader transmitting the tampered data to the user card reader is tw1). After receiving the tampered data, the user card reader processes the data (the time to process the data is t1), and transmit the processed data to the man-in-middle card reader. The man-in-middle card reader may tamper with the processed data returned by the user smart card, and transmit the tampered data to the merchant card reader through the man-in-middle smart card (the time period from the man-in-middle card reader receiving the processed data returned by the user smart card to the man-in-middle card reader transmitting the tampered data to the merchant card reader through the man-in-middle smart card is tw2). Then, the time period required by the merchant card reader from finishing transmitting the data to receiving the data fed back by the user smart card is T2=t1+tw1+tw2.

According to the existing smart card communication protocol, as long as T2<FWT, the merchant card reader will receive the data transmitted by the man-in-middle smart card and perform subsequent operations (e.g. transaction process), such that there is a danger that the man-in-middle hijacks the data while the merchant card reader does not know it, resulting in the economic loss of the merchant.

SUMMARY

An aspect of the present disclosure provides a data communication method, including: a first terminal transmitting first data to a second terminal, and starting time from a time point when finishing transmitting the first data, wherein the first data at least includes data to be processed; the second terminal receiving the first data, and starting time from a time point when finishing receiving the first data; when a value obtained by the second terminal from the timing reaches a preset value, the second terminal transmitting second data to the first terminal, wherein the second data is data obtained by the second terminal performing data processing on the data to be processed; and when a value obtained by the first terminal from the timing is in a valid range of the preset value, the first terminal allowing to start receiving the second data.

Another aspect of the present disclosure provides a data communication system, including a first terminal and a second terminal. The first terminal is configured to transmit first data to the second terminal, and start timing from a time point when finishing transmitting the first data, wherein the first data at least includes data to be processed; the second terminal is configured to receive the first data, and start timing from a time point when finishing receiving the first data; the second terminal is further configured to transmit second data to the first terminal when a value obtained by the second terminal from the timing reaches a preset value, wherein the second data is data obtained by the second terminal performing data processing on the data to be processed; the first terminal is further configured to allow to start receiving the second data, when a value obtained by the first terminal from the timing is in a valid range of the preset value.

Another aspect of the present disclosure further provides a data communication method, including: a first terminal transmitting first data to a second terminal, and starting timing from a time point when finishing transmitting the first data, wherein the first data at least includes data to be processed; the second terminal receiving the first data, and starting timing from a time point when finishing receiving the first data; when a value obtained by the second terminal from the timing reaches a preset value, the second terminal transmitting second data to the first terminal, wherein the second data is data obtained by the second terminal performing data processing on the data to be processed; and when a value obtained by the first terminal from the timing reaches the preset value, the first terminal allows to start receiving the second data.

Another aspect of the present disclosure further provides a data communication system, including a first terminal and a second terminal. The first terminal is configured to transmit first data to the second terminal, and start timing from a time point when finishing transmitting the first data, wherein the first data at least includes data to be processed; the second terminal is configured to receive the first data, and start timing from a time point when finishing receiving the first data; the second terminal is further configured to transmit second data to the first terminal when a value obtained by the second terminal from the timing reaches a preset value, wherein the second data is data obtained by the second terminal performing data processing on the data to be processed; the first terminal is further configured to allow to start receiving the second data, when a value obtained by the first terminal from the timing reaches the preset value.

The above and other objectives, advantages and features of the present disclosure will become more apparent to those skilled in the art from following detailed descriptions of specific embodiments of the present disclosure in combination with the accompanying drawings.

BRIEF DESCRIPTION OF THE DRAWINGS

Some specific embodiments of the present disclosure will be described in detail in an exemplary but non-restrictive manner with reference to the drawings. The same reference numbers in the drawings identify the same or similar components or parts. Those skilled in the art should understand that the drawings are not necessarily drawn to scale. In the drawings.

DETAILED DESCRIPTION

Embodiment 1

Figure 1:
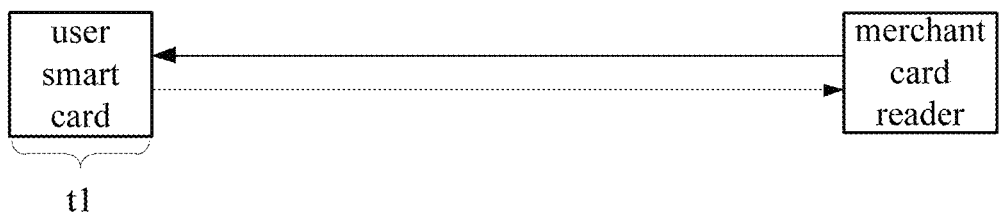
FIG. 1 is a schematic diagram illustrating a time period required by a merchant card reader from finishing transmitting data to receiving data returned by a user smart card under normal circumstances in the background of the present disclosure.
Figure 2:
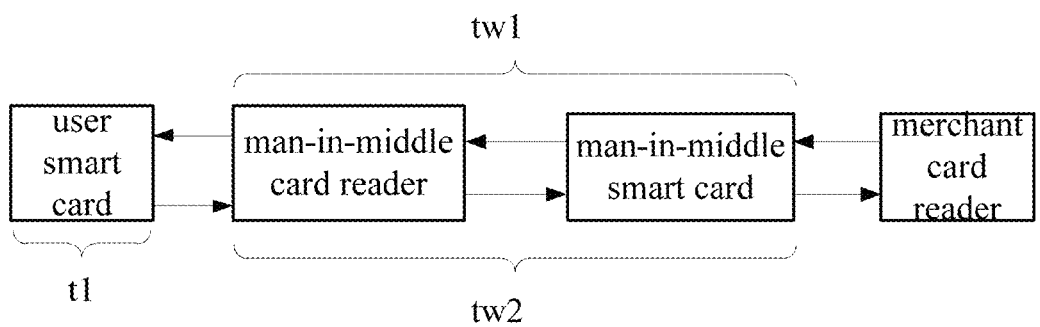
FIG. 2 is a schematic diagram illustrating a time period required by a merchant card reader from finishing transmitting data to receiving data returned by a user smart card in the case of data hijacking from a man-in-middle in the background of the present disclosure.
Figure 3:
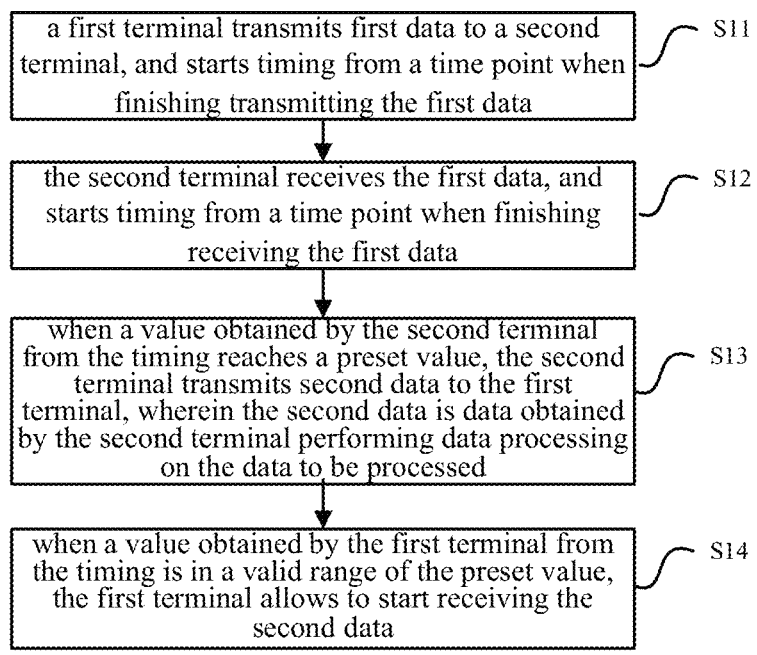
FIG. 3 is a flow chart of a data communication method according to embodiment 1 of the present disclosure.

FIG. 3 is a flow chart of a data communication method according to embodiment 1 of the present disclosure. As illustrated in FIG. 3, the method includes at least steps S11 to S14.

In step S11, a first terminal transmits first data to a second terminal, and starts timing from a time point when finishing transmitting the first data, wherein the first data at least includes data to be processed.

In this embodiment, a communication mode between the first terminal and the second terminal includes a short-range wireless communication mode, and specifically, the short-range wireless communication mode includes at least: NFC (Near Field Communication), Wi-Fi (Wireless Fidelity), UWB (UltraWideband), Zigbee, RFID (Radio Frequency Identification), infrared transmission, and Bluetooth. Therefore, the communication distance between the first terminal and the second terminal can be several centimeters to several hundred meters. Based on the short-range wireless communication mode described above, corresponding to different communication modes, communication between the first terminal and the second terminal would adopt a corresponding communication protocol to implement wireless data transmission between the two. As an alternative implementation of the present disclosure, the first terminal includes a reading device, the second terminal includes a response device, and the reading device and the response device can be terminals that support a contactless card reading mode, for example, the reading device can be a terminal of a card reader type such as a POS machine, an ATM machine, or an ID card reader, and the response device can be a terminal such as an intelligent cipher device (such as a USB key of Industrial and Commercial Bank of China, a USB key of Agricultural Bank of China), a smart card, and an ID card. Terminals using the above-mentioned non-contact card reading method, for example, the card reader and the smart card, or the card reader and the ID card, can use the protocols ISO14443 and ISO15693 for data transmission therebetween. The short-range wireless communication mode can include: the communication modes supported by the ISO14443 and the ISO15693 protocol. In addition, the reading device and the response device can also be terminals supporting short-range wireless communication modes such as a mobile terminal, a PC, a palmtop computer, and a smart device.

In this step, as an alternative implementation of the present disclosure, taking the first terminal being a card reader and the second terminal being a smart card as an example, the data to be processed in the first data can be card reading request data. Of course, the data to be processed in the first data is not limited thereto. For example, the first terminal and the second terminal are both mobile terminals, and the data to be processed in the first data can also be request data for requesting the second terminal to return a picture, and the like. This embodiment does not impose excessive restrictions on the data to be processed in the first data, as long as it is the request data initiated by the first terminal to the second terminal.

Based on the problem in the background, in this embodiment, in order to be able to identify data hijacking from a man-in-middle even when the second data is received at the time T2 less than a frame waiting time (FWT), the scheme of the first terminal performing timed receiving data and the second terminal performing timed transmitting data is adopted. Therefore, in this step, the first terminal starts timing from a time point when finishing transmitting the first data, and if data returned by the second terminal is received when the value obtained from timing is in the valid range of the preset value, it indicates that there is no data hijacking from the man-in-middle, and if data is not received when the value obtained from timing is in the valid range of the present value, the data hijacking at from the man-in-middle can be identified.

In step S12, the second terminal receives the first data, and starts timing from a time point when finishing receiving the first data.

In this embodiment, after receiving the first data, the second terminal does not transmit the processed data to the first terminal immediately after the first data processing is completed as in the related art, but starts timing, and adopts the scheme of the first terminal performing timed receiving data and the second terminal performing timed transmitting data. When the value obtained from timing reaches a preset value, the second terminal transmits the second data obtained by processing the data to be processed in the first data, i.e. performs timed transmission (refer to step S13), such that the first terminal can identify whether there is a case of data hijacking from the man-in-middle even when the second data is received at the time T2 less than the frame waiting time (FWT).

In step S13, when a value obtained by the second terminal from the timing reaches a preset value, the second terminal transmits second data to the first terminal, wherein the second data is data obtained by the second terminal after performing data processing on the data to be processed.

In this embodiment, the second data is not limited, and the second data is data obtained after performing data processing on the data to be processed in the first data. Taking the second terminal being a smart card and the first terminal being a card reader as an example, the second data may be data content of the smart card requested for reading by the first terminal, and taking the first terminal and the second terminal being mobile terminals as an example, the data to be processed in the first data is the data of requesting a picture, and the second data is the picture data. As described in step S12, the second terminal starts timing from a time point when finishing receiving the first data. In this step, when the value obtained by timing reaches the preset value S, the second terminal transmits the second data to the first terminal to ensure timed transmission.

In step S14, when a value obtained by the first terminal from timing is in a valid range of the preset value, the first terminal allows to start receiving the second data.

As an alternative implementation of the present disclosure, the valid range of the preset value is [S, S+2ΔS], wherein, S is the preset value, and ΔS is determined by a maximum communication distance supported by a communication mode adopted between the first terminal and the second terminal.

In this embodiment, as mentioned above, the communication mode adopted between the first terminal and the second terminal may be short-range wireless communication, and may include multiple communication modes. Moreover, the maximum communication distance supported by each communication mode is different, for example, the working frequency of NFC is 13.56 MHz, and the supported communication distance is within 20 cm, while the working frequency of Bluetooth is 2.4 GHz, and the supported communication distance can reach 20 m, and WiFi can reach 100 m. ΔS can be understood as the value required for the maximum communication distance supported by the communication mode adopted between the first terminal and the second terminal, for example, the duration required to transmit the first data through the maximum communication distance, etc. Since the maximum communication distance supported by each communication mode is different, the value of the corresponding ΔS will also be different, of course, ΔS may also include other meanings, as described in detail below.

It should be noted that the first data is continuously transmitted to the second terminal in a byte manner, and the first terminal continuously transmits the first byte, the second byte, . . . the last byte of the first data, the second terminal continuously receives the first byte, the second byte, . . . the last byte of the first data. Since the short-range communication mode is adopted between the first terminal and the second terminal, during the process in which the first terminal starts to transmit respective bytes of the first data, the second terminal has begun to receive respective bytes of the first data. Considering that the duration in which the terminal receives a single byte is in a small order of magnitude, which can be ignored, when the first byte of first data arrives at the second terminal, the last byte of the first data has not been transmitted yet, that is, the first terminal has not finished transmitting the first data. Without considering the transmission time on the line, we can think that the first terminal transmits the first data simultaneously when the second terminal receives the first data, that is, the time at which the first terminal finishes transmitting the first data is the time at which the second terminal finishes receiving the first data. When considering the transmission time on the line, the maximum value of the value obtained by the first terminal from the timing can reach S+2ΔS, that is, the time when the data transmitted between the first terminal and the second terminal is transmitted on the line is considered (the maximum duration calculated according to the maximum distance supported by the communication mode is 2Δ5). Therefore, in step S11, the timing starts at the time point when the first terminal finishes transmitting the first data, and in step S12, the timing starts at the time point when the second terminal finishes receiving the first data. Without considering the transmission time on the line, and without the data hijacking from the man-in-middle, the first terminal should be able to receive the second data when the value obtained by timing reaches S. In the case of considering the transmission time on the line, and without the data hijacking from the man-in-middle, the first terminal should be able to start receiving the second data when the value obtained by timing is greater than S and less than or equal to S+2ΔS.

Based on the problems existing in the existing smart card communication protocol proposed in the background, the present embodiment provides a data communication method. The data communication method avoids the problems in the related art through the scheme that the second terminal performs timed transmitting data (transmits data when the value obtained by timing reaches the preset value S) and the first terminal performs timed receiving data returned by the second terminal (receives data when the value obtained by timing is within the valid range of the preset value [S, S+2ΔS]). The first terminal can be a merchant card reader in the background and the second terminal can be a user smart card in the background. The first terminal is only permitted to receive the data returned by the second terminal when the value obtained by the first terminal from timing is within the valid range [S, S+2ΔS] of the preset value, and not permitted to receive the data returned by the second terminal outside the valid range of the preset value. Therefore, if the first terminal is permitted to start receiving data and receives the second data when the value obtained by the first terminal from timing is in the valid range of the preset value, it indicates that there is no data hijacking from the man-in-middle; and if the first terminal is permitted to start receiving data but does not receive the second data when the value obtained by the first terminal from timing is in the valid range of the preset value, it indicates that there is data hijacking from the man-in-middle. In this embodiment, S+2ΔS≤FWT, where FWT is a frame waiting time specified by a communication protocol adopted by the first terminal and the second terminal, for example, a frame waiting time FWT specified by protocols ISO14443 and ISO15693, such that the first terminal (for example, the card reader) will wait for the smart card to return data within the frame waiting time while implementing the timed reception scheme provided in this embodiment. Therefore, the method provided by this embodiment can identify data hijacking from the man-in-middle while being compatible with the existing protocol. In the case of hijacking from the man-in-middle, when the duration $2\Delta S$ required to transmit data back and forth between the two terminals is not neglected, taking S as the preset duration as an example, since the second terminal transmits the data when the value obtained by the second terminal from timing reaches S, $T2=s1+s2+S+2\Delta S$, where T2 is the time required for the first terminal from finishing transmitting the first data to receiving the data fed back by the second terminal, and s1+s2 is the time required for the man-in-middle to perform the tampering process (reference may be made to tw1 and tw2 in the background, in which tw1 corresponds to s1 and tw2 corresponds to s2), and the time T2 exceeds the maximum value $S+2\Delta S$ of the valid range of the preset value even if T2<FWT, such that the first terminal refuses to receive the data returned by the second terminal, and interrupts communication with the second terminal. Therefore, the first terminal can identify data hijacking from the man-in-middle even if T2<FWT. It should be noted that, in this embodiment, S and $\Delta S$ may include various forms in addition to representing the duration. Here, for the sake of easy understanding, the duration is merely taken as an example. In this embodiment, various forms included by S and $\Delta S$ may be mentioned, and are specifically described below.

In this embodiment, the preset value S may be pre-stored in the fixed area of the terminal before the terminal leaves the factory without negotiation, or may be obtained by the first terminal and the second terminal through negotiation, or may be generated by one party and transmitted to the other party, or may be written by the first terminal in a data packet specified by the protocol, and transmitted to the second terminal together when the first terminal transmits data to the second terminal. Although the preset value pre-stored in the terminal before leaving the factory does not need to be negotiated or generated, the data output of the first terminal and the second terminal is periodically transmitted and received according to the preset value, the disadvantage of which is that the preset value cannot be changed, which is not flexible, random, and has low security. The other methods for obtaining the preset value S can randomly generate the preset value, which are more flexible, random, and have higher security. The preset value S is crucial for identifying data hijacking from the man-in-middle. Therefore, in order to prevent the preset value S from being tampered with, the present embodiment provides several methods for obtaining the preset value S. The methods of obtaining the preset value S will be described in detail below.

As an alternative implementation of the present disclosure, in this embodiment, the following steps may be used for negotiation to obtain the preset value, and the negotiation may be performed at any time before the first terminal transmits the first data to the second terminal, which is more flexible, random, and safer than the preset value pre-stored in the terminal before leaving the factory. Specifically, before the first terminal starts timing from the time point when finishing transmitting the first data, the method further includes following operations.

The first terminal and the second terminal perform mutual identity authentication, after passing the mutual identity authentication, the first terminal and the second terminal negotiate with each other to obtain a transmission key.

The second terminal generates the preset value, and encrypts the preset value by using the transmission key, and transmits the encrypted preset value to the first terminal, and the first terminal decrypts the encrypted preset value by using the transmission key to obtain the preset value, and saves the preset value; or, the first terminal generates the preset value, and encrypts the preset value by using the transmission key, and transmits the encrypted preset value to the second terminal, and the second terminal decrypts the encrypted preset value by using the transmission key to obtain the preset value, and saves the preset value.

Therefore, in this embodiment, the first terminal and the second terminal perform the mutual identity authentication to ensure the legal identity of the first terminal and the second terminal, further negotiate to obtain the transmission key, and use the transmission key to encrypt and decrypt the preset value to ensure the security of the transmission process, thereby preventing the preset value obtained through negotiation from being illegally tampered with and ensuring the safety of the preset value. In addition, no matter whether the first terminal or the second terminal saves the preset value after receiving the preset value transmitted by the other party, the preset value may be used in the next data communication. By saving the preset value, the two terminals do not need to perform the interaction process of negotiating the preset value again, which greatly improves the data transmission efficiency.

Figure 4:
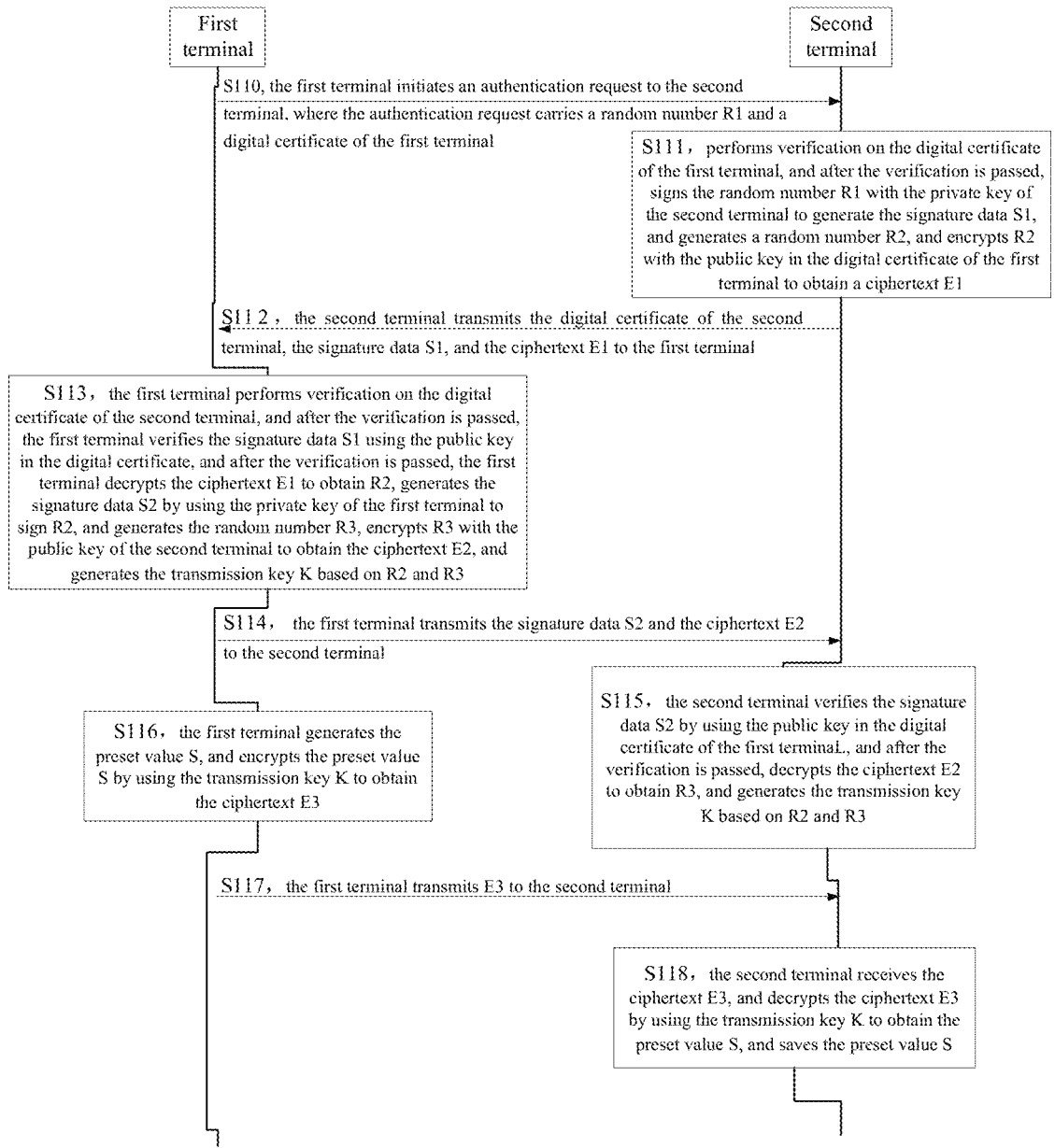
FIG. 4 is a flow chart of a specific method of negotiating a preset value between a first terminal and a second terminal according to embodiment 1 of the present disclosure.

Specifically, the manner in which the preset value is obtained by negotiating in the alternative implementation may be implemented in multiple manners. This embodiment only gives an example, so as to clearly understand the manner in which the preset value is obtained by negotiating in the alternative implementation. As illustrated in FIG. 4, the embodiment provides a specific process for the first terminal to negotiate the preset value with the second terminal, which specifically includes the following steps:

In step S110, the first terminal initiates an authentication request to the second terminal, where the authentication request carries a random number R1 and a digital certificate of the first terminal.

The random number R1 is one-time authentication data generated by the first terminal, which can prevent replay attacks to the first terminal from other illegal devices.

In step S111, the second terminal receives the authentication request, and performs verification on the digital certificate of the first terminal. After the verification is passed, the second terminal signs the random number R1 with the private key of the second terminal to generate the signature data S1, and generates a random number R2, and encrypts R2 with the public key in the digital certificate of the first terminal to obtain a ciphertext E1.

The random number R2 is one-time authentication data generated by the second terminal, which can prevent replay attacks to the second terminal from other illegal devices.

In step S112, the second terminal transmits the digital certificate of the second terminal, the signature data S1, and the ciphertext E1 to the first terminal.

In step S113, the first terminal performs verification on the digital certificate of the second terminal. After the verification is passed, the first terminal verifies the signature data S1 using the public key in the digital certificate. After the verification is passed, the first terminal decrypts the ciphertext E1 to obtain R2, generates the signature data S2 by using the private key of the first terminal to sign R2, and generates the random number R3, encrypts R3 with the public key of the second terminal to obtain the ciphertext E2, and generates the transmission key K based on R2 and R3.

The legality of the identity of the second terminal can be ensured by the verification of the signature data S1 of the second terminal by the first terminal. In addition, by using the random numbers generated by the respective two parties to generate the transmission key, it can be ensured that even if a hacker intercepts a random number of a certain party, the transmission key cannot be generated because there is no random number of the other party, thereby ensuring that the transmission key is not easily obtained.

In step S114, the first terminal transmits the signature data S2 and the ciphertext E2 to the second terminal.

In step S115, the second terminal verifies the signature data S2 by using the public key in the digital certificate of the first terminal. After the verification is passed, the second terminal decrypts the ciphertext E2 to obtain R3, and generates the transmission key K based on R2 and R3.

The legality of the identity of the first terminal can be ensured by the verification of the signature data S2 of the first terminal by the second terminal.

In step S116, the first terminal generates the preset value S, and encrypts the preset value S by using the transmission key K to obtain the ciphertext E3.

In step S117, the first terminal transmits E3 to the second terminal.

In step S118, the second terminal receives the ciphertext E3, and decrypts the ciphertext E3 by using the transmission key K to obtain the preset value S, and saves the preset value S.

In this alternative implementation of the present disclosure, the mutual authentication between the first terminal and the second terminal and the negotiation of the transmission key are completed from step S110 to step S115. In steps S116 to S118, the operations performed by the first terminal and the second terminal are interchangeable, that is, the second terminal generates the preset value S, and encrypts S by using K to obtain the ciphertext E3, and transmits E3 to the first terminal, and the first terminal decrypts E3 by using the transmission key K to obtain the preset value S and saves the preset value S.

As another alternative implementation of the present disclosure, this embodiment can realize the way that one party generates the preset value and sends the preset value to the other party through the following steps, in which the negotiation can occur at any time before the first terminal transmits the first data to the second terminal. The preset value generated in this way is more flexible, random, and safer than the preset value pre-stored in the terminal before leaving the factory. Specifically, before the first terminal starts timing from the time point when finishing transmitting the first data, the method provided in this embodiment further includes followings.

The first terminal and the second terminal perform mutual identity authentication.

After the mutual identity authentication is passed, the second terminal generates the preset value, and encrypts the preset value by using the public key of the first terminal, and transmits the encrypted preset value to the first terminal, and the first terminal decrypts the encrypted preset value by using its own private key to obtain the preset value, and saves the preset value; or, after the mutual identity authentication is passed, the first terminal generates the preset value, and encrypts the preset value by using the public key of the second terminal, and transmits the encrypted preset value to the second terminal, and the second terminal decrypts the encrypted preset value by using its own private key to obtain the preset value, and saves the preset value.

Therefore, in this embodiment, the mutual identity authentication of the first terminal and the second terminal can ensure the legality identity of the first terminal and the second terminal. Further, the public and private keys are used to encrypt and decrypt the preset value to ensure the security of the transmission process, thereby preventing the preset value generated by one party from being illegally tampered with and ensuring the safety of the preset value. Compared with the foregoing alternative implementation, this alternative implementation uses the public and private keys of the first terminal and the second terminal to implement encryption and decryption of the preset value, which does not need to generate a transmission key, thereby reducing interaction steps, shortening the time for obtaining the preset value, and improving efficiency. In addition, no matter whether the first terminal or the second terminal saves the preset value after receiving the preset value transmitted by the other party, the preset value can be continuously used in the next data communication. By saving the preset value, the two terminals do not need to perform the interaction process of negotiating the preset value again, which greatly improves the data transmission efficiency.

Figure 5:
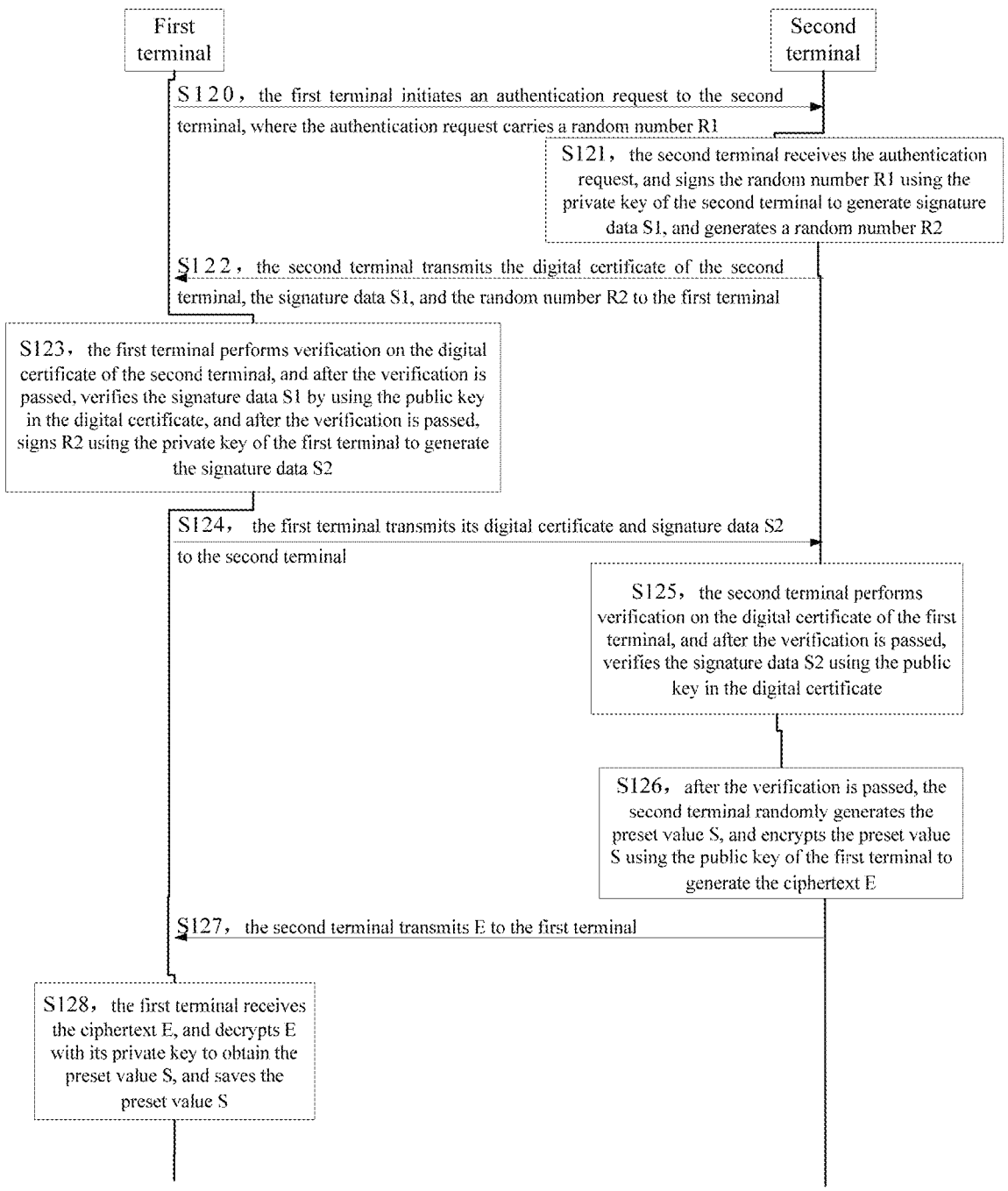
FIG. 5 is a flow chart of a specific method of negotiating a preset value between a first terminal and a second terminal according to embodiment 1 of the present disclosure.

Specifically, the manner in which the preset value is obtained in this alternative implementation may be implemented in multiple manners. This embodiment only gives an example, so as to clearly understand the manner in which the preset value is obtained in the alternative implementation. As illustrated in FIG. 5, this embodiment provides a specific process for the first terminal to negotiate the preset value with the second terminal, which specifically includes the following steps.

In step S120, the first terminal initiates an authentication request to the second terminal, where the authentication request carries a random number R1.

The random number R1 is one-time authentication data generated by the first terminal, which can prevent replay attacks to the first terminal from other illegal devices.

In step S121, the second terminal receives the authentication request, and signs the random number R1 using the private key of the second terminal to generate signature data S1, and generates a random number R2.

The random number R2 is one-time authentication data generated by the second terminal, which can prevent replay attacks to the second terminal from other illegal devices.

In step S122, the second terminal transmits the digital certificate of the second terminal, the signature data S1, and the random number R2 to the first terminal.

In step S123, the first terminal performs verification on the digital certificate of the second terminal. After the verification is passed, the first terminal verifies the signature data 51 by using the public key in the digital certificate. After the verification is passed, the first terminal signs R2 using the private key of the first terminal to generate the signature data S2.

The legality of the identity of the second terminal can be ensured by the verification of the signature data 51 of the second terminal by the first terminal.

In step S124, the first terminal transmits its digital certificate and signature data S2 to the second terminal.

In step S125, the second terminal performs verification on the digital certificate of the first terminal, and after the verification is passed, verifies the signature data S2 using the public key in the digital certificate.

The legality of the identity of the first terminal can be ensured by the verification of the signature data S2 of the first terminal by the second terminal.

In step S126, after the verification is passed, the second terminal randomly generates the preset value S, and encrypts the preset value S using the public key of the first terminal to generate the ciphertext E.

In step S127, the second terminal transmits E to the first terminal.

In step S128, the first terminal receives the ciphertext E, and decrypts E with its private key to obtain the preset value S, and saves the preset value S.

In the alternative implementation of the present disclosure, the mutual authentication between the first terminal and the second terminal is implemented from step S120 to step S125, and after the mutual identity authentication is passed, the second terminal generates the preset value. In steps S126 to S128, the operations performed by the first terminal and the second terminal are interchangeable, that is, the first terminal generates the preset value S, and encrypts the preset value S by using the public key of the second terminal to obtain ciphertext E, and transmits E to the second terminal, and the second terminal decrypts E with its private key to obtain a preset value S and saves it. Compared with the way of obtaining the preset value as illustrated in FIG. 4, this alternative implementation does not need to negotiate the transmission key, but directly uses the public and private keys of the first terminal and the second terminal to perform encryption and decryption, thereby reducing the interaction process of negotiating the transmission key, and improving the efficiency of obtaining the preset value.

As a third alternative implementation of the present disclosure, this embodiment can realize through the following steps that the first terminal writes the preset value into the data packet specified by the protocol and transmits it to the second terminal together when the first terminal transmits the data to the second terminal, thus realizing that both parties obtain the preset value. Specifically, before the first terminal transmits the first data to the second terminal in step S11, the method provided in this embodiment further includes the first terminal generating the preset value; the first data transmitted by the first terminal to the second terminal at least further includes the preset value and a tamper-resistant check value calculated based on the preset value; after the second terminal receives the first data in step S12, the method provided in this embodiment further includes: the second terminal acquiring the preset value and the tamper-resistant check value from the first data, and verifying the tamper-resistant check value, and saving the preset value after the verification is passed.

In the alternative implementation of the present disclosure, the first terminal may randomly generate one preset value, and write the preset value and the tamper-resistant check value into the predetermined field according to the format of the data packet specified by the protocol, or may add a new field, and write the preset value and the tamper-resistant check value into the newly added field, and transmit them in the data packet carried in the first data to the second terminal when the first terminal transmits the first data to the second terminal. The tamper-resistant check value is calculated based on the preset value, for example, the tamper-resistant check value may be signature data calculated based on the preset value, that is, a digest is calculated and generated for the preset value, and the signature data is generated by encrypting the digest using the private key of the first terminal, and the second terminal can verify the signature data by using the public key of the first terminal when verifying the tamper-resistant check value. If the signature data passes the verification, the verification is passed, indicating that the preset value has not been tampered with. For another example, the tamper-resistant check value may be a MAC value calculated by using a MAC algorithm based on the preset value, and the second terminal may obtain a MAC value calculated by using the same MAC algorithm when verifying the tamper-resistant check value, and the two MAC values are compared. If they are consistent, the verification is passed, indicating that the preset value has not been tampered with.

It should be noted that the second terminal starts timing after finishing receiving the first data, and obtains the preset value from the first data. If the tamper-resistant check value is verified, the second terminal transmits the second data to the first terminal after the value obtained by timing reaches the preset value, and afterwards, if the first terminal does not receive the second data returned by the second terminal within the valid range of the preset value, it indicates that the data hijacking from the man-in-middle occurs. If the verification of the tamper-resistant check value fails, the second terminal will stop timing, and in this case, it indicates that there has been a situation in which the data is hijacked by the man-in-middle. Therefore, in the alternative implementation of the present disclosure, the data hijacking from the man-in-middle can also be identified by the tamper-resistant check value, and once the preset value is tampered with, the verification fails, thereby ensuring that the preset value is not illegally tampered with and ensuring the safety of the preset value.

In addition, in this embodiment, as an alternative implementation of the present disclosure, the preset value may include at least: a preset duration, a preset number of cycles, a preset number of pulses, or a preset phase difference. Therefore, in this embodiment, the first terminal and the second terminal also correspondingly have different statistics methods of timing, and different methods for determining whether the value obtained by timing reaches the preset value or is within the valid range of the preset value. The following is a detailed description of various preset values.

As an alternative implementation of the present disclosure, the preset value may include a preset duration, where the preset duration is greater than the duration in which the second terminal performs data processing on the data to be processed in the received first data (since the second terminal needs to transmit the second data after data processing when the value obtained by timing reaches the preset value). In addition, optionally, $S+2\Delta S \leq FWT$; $\Delta S$ is a duration required for the first terminal to transmit data to the second terminal when the distance between the first terminal and the second terminal is the maximum communication distance supported by the communication mode adopted by the two terminals. In step S14, the value obtained by the first terminal from timing being in the valid range of the preset value includes the duration obtained by the first terminal after finishing transmitting the first data being within the range of $[S, S+2\Delta S]$; in step S13, the value obtained by the second terminal from timing reaching the preset value includes the duration obtained by the second terminal after finishing receiving the first data reaching the preset duration.

In this alternative implementation of the present disclosure, both the first terminal and the second terminal have a timer, which supports the precise timing function, and can determine whether it reaches the preset duration or whether it is in the valid range of the preset duration according to the duration obtained by the timer. For example, the second terminal may be a smart card with a crystal oscillator, and the smart card with the crystal oscillator can count the timing by the duration counted by its internal clock, and the timing accuracy is determined by the clock accuracy of the smart card. For example, $S=5\times10^{-3}$ s, in the case of Bluetooth, the transmission duration $\Delta S$ of the maximum transmission distance (20 m) supported by Bluetooth is $60\times10^{-9}$ s, then, the second terminal transmits the second data when the timing reaches 5×10⁻³ s, and the first terminal only permits to start receiving the second data within [5×10⁻³ s, (5×10⁻³+1.2×10⁻⁷) s]. Further, only when the second data is received within the valid range of the preset value, it indicates that there is no data hijacking from the man-in-middle. Therefore, the data hijacking from the man-in-middle can be identified. Although the alternative implementation is exemplified only by Bluetooth communication, other short-range communication modes are within the protection scope of the present disclosure.

For a passive, crystal-free terminal (such as a smart card), the terminal has no timing function, and in this embodiment, the first terminal always generates a carrier signal during the entire process of communication between the first terminal and the second terminal. Therefore, in this embodiment, a timing method different from the clock timing is proposed. In this embodiment, the value can also be counted by calculating the number of cycles, the number of pulses, and the phase difference of the carrier signal. The preset value may specifically include the preset number of cycles of the carrier signal, the preset number of pulses of the carrier signal, and the preset phase difference of the carrier signal. Specifically, ΔS may indicate the number of cycles, the number of pulses, and the phase change value generated by the carrier signal over the maximum communication distance supported by the communication mode adopted between the first terminal and the second terminal, wherein, the duration corresponding to S+2ΔS is greater than the duration of the data processing by the second terminal to the data to be processed in the received first data, regardless of which of the timing methods is adopted. In addition, optionally, the duration corresponding to the sum of S+2ΔS may be less than or equal to FWT.

As an alternative implementation of the present disclosure, the preset value may include the preset number of cycles; ΔS is the number of cycles generated by the carrier signal passing through the maximum communication distance supported by the communication mode adopted between the first terminal and the second terminal; in step S14, the value obtained by the first terminal from timing being in the valid range of the preset value includes the number of cycles of the carrier signal continuously transmitted by the first terminal to the second terminal after finishing transmitting the first data being within the range of [S, S+2ΔS]; in step S13, the value obtained by the second terminal from timing reaching the preset value includes the number of cycles of the carrier signal continuously received by the second terminal after finishing receiving the first data reaching the preset number of cycles.

In this embodiment, the first terminal keeps generating the carrier signal. When the first terminal needs to transmit data, for example, the first terminal transmits the first data by modulating the first data on the carrier signal and transmitting the carrier signal to the second terminal. When the first terminal does not need to transmit data, the first terminal transmits the carrier signal to the second terminal, and the carrier signal does not carry data. In the alternative implementation of the present disclosure, the first terminal and the second terminal both have a counter, and can calculate the number of cycles of the carrier signal in the foregoing situation. The alternative implementation provides an alternative way of counting the value. The first terminal and the second terminal can achieve accurate timing without using a clock timing. For example, in the case of terminals supporting the NFC communication mode, the operating frequency of the first terminal and the second terminal is 13.56 MHz. During the communication between the first terminal and the second terminal, the first terminal (such as a card reader) keeps generating a carrier of 13.56 MHz, and the time period T of the carrier is fixed, i.e., T=1/13.56 MHz, which is approximately equal to 74 ns. A unit of the value obtained by counting timing in cycles can be accurate to ns, thereby achieving accurate statistics effect. Moreover, the alternative implementation can be applied to a passive card without a crystal oscillator. Although this alternative implementation is exemplified only by NFC communication, other short-range communication modes are within the protection scope of the present disclosure.

In addition, as another alternative implementation of the present disclosure, the preset value may include the preset number of pulses; ΔS is the number of pulses generated by the carrier signal passing through the maximum communication distance supported by the communication mode adopted between the first terminal and the second terminal; in step S14, the value obtained by the first terminal from timing being in the valid range of the preset value includes the number of pulses of the carrier signal continuously transmitted by the first terminal to the second terminal after completion of transmitting the first data being within the range of [S, S+2ΔS]; in step S13, the value obtained by the second terminal from timing reaching the preset value includes the number of pulses of the carrier signal continuously received by the second terminal after completion of receiving the first data reaching the preset number of pulses.

Compared with the above method of counting the number of cycles of the carrier signal, counting the number of pulses of the carrier signal, i.e. counting the number of peaks of the carrier signal, can achieve the effect of further accurate counting. Furthermore, this alternative implementation can be applied to passive, crystal-free smart cards.

In addition, as another alternative implementation of the present disclosure, the preset value may include the preset phase difference; ΔS is a phase change value generated by the carrier signal passing through the maximum communication distance supported by the communication mode adopted between the first terminal and the second terminal; in step S14, the value obtained by the first terminal from timing being in the valid range of the preset value includes a phase difference between a first phase and a second phase of the carrier signal being within the range of [S, S+2ΔS], wherein, the first phase is a phase of the carrier signal at a time point when the first terminal finishes transmitting the first data, the second phase is a phase of the carrier signal at a time point when the first terminal permits to start receiving the second data; in step S13, the value obtained by the second terminal from timing reaching the preset value includes a phase difference between a third phase and a fourth phase of the carrier signal reaching the preset phase difference, wherein, the third phase is a phase of the carrier signal at a time point when the second terminal finishes receiving the first data, the fourth phase is a phase of the carrier signal at a time point when the second terminal starts transmitting the second data.

For example, the first terminal and the second terminal can negotiate or generate by one party the preset phase difference S=(½+40) π by using the previously mentioned method of obtaining the preset value. Taking the first terminal being a card reader and the second terminal being a smart card as an example, after the card reader finishes transmitting the first data and after the smart card finishes receiving the first data, the communication waveform between the two is a standard sine wave carrier, and the phase at this moment is recorded as 0 (i.e., the first phase and the third phase are 0). When the carrier phase difference (i.e., the phase difference between the third phase and the fourth phase) reaches (½+40) π, the smart card transmits the second data. At this time, the card reader can confirm the absence of hijacking from the man-in-middle by permitting to start receiving and receiving the second data when the phase difference obtained by timing is within the valid range of the preset value. Taking NFC as an example, if the carrier signal carrying the first data has a phase change value ΔS=¼π(generated by the NFC-supported maximum transmission distance of 20 cm, the first terminal is permitted to start receiving the second data only within [(½+40) π, 4π]. Only when the second data is received within the valid range of the preset value, it indicates that there is no data hijacking from the man-in-middle. Therefore, the data hijacking from the man-in-middle can be identified.

In this alternative implementation of the present disclosure, the terminals supporting the NFC communication mode are taken as an example, in which the operating frequency of the first terminal and the second terminal is 13.56 MHz. During the communication between the first terminal and the second terminal, the first terminal (such as a card reader) keeps generating a carrier of 13.56 MHz, and the time period of the carrier is fixed, i.e., T=1/13.56 MHz, which is approximately equal to 74 ns. The phase can be dividing one period in the degree of 2π. The unit can be accurate to 74/2π ns when the timing is counted by phase. Compared with the above-mentioned methods of counting the number of cycles and the number of pulses of the carrier signal, counting the phase difference can achieve further accurate statistics effect. Moreover, the alternative implementation can be applied to passive, crystal-free smart cards. Although this alternative implementation is exemplified only by NFC communication, other short-range communication modes are within the protection scope of the present disclosure.

According to the data communication method provided by embodiments of the present disclosure, by adopting the scheme that the first terminal performs timed receiving data and the second terminal performs timed transmitting data, the first terminal can identify data hijacking from the man-in-middle even when the second data is received at the time T2 less than the frame waiting time (FWT), avoiding the user from economic loss without knowing.

Embodiment 2

Figure 6:
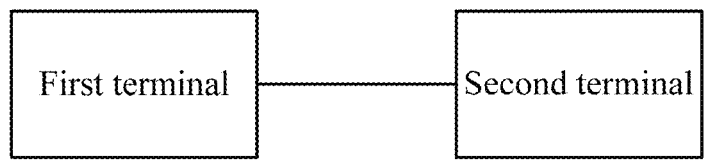
FIG. 6 is a block diagram of a data communication system according to embodiment 2 of the present disclosure.

Based on the same inventive concept, an embodiment of the present disclosure further provides a data communication system. As illustrated in FIG. 6, the data communication system includes a first terminal and a second terminal, and the first terminal and the second terminal perform the data communication method as in Embodiment 1.

The first terminal is configured to transmit first data to the second terminal, and start timing from a time point when finishing transmitting the first data, wherein the first data at least includes data to be processed. The second terminal is configured to receive the first data, and start timing from a time point when finishing receiving the first data. The second terminal is further configured to transmit second data to the first terminal when a value obtained by the second terminal from timing reaches a preset value, wherein the second data is data obtained by the second terminal after performing data processing on the data to be processed. The first terminal is further configured to permit to start receiving the second data, when a value obtained by the first terminal from timing is in a valid range of the preset value.

As an alternative implementation of the present disclosure, the valid range of the preset value is [S, S+2ΔS], wherein, S is the preset value, and ΔS is determined by a maximum communication distance supported by a communication mode adopted between the first terminal and the second terminal. The duration corresponding to S+2ΔS is less than or equal to the frame waiting time FWT specified by the communication protocol adopted by the first terminal and the second terminal.

As an alternative implementation of the present disclosure, the communication mode adopted between the first terminal and the second terminal includes a short-range wireless communication mode.

As an alternative implementation of the present disclosure, the first terminal is further configured to perform mutual identity authentication with the second terminal before the first terminal starts timing from the time point when finishing transmitting the first data, and negotiate with the second terminal to obtain a transmission key after the mutual identity authentication is passed.

The second terminal is further configured to generate the preset value, and encrypt the preset value by using the transmission key, and transmit the encrypted preset value to the first terminal; the first terminal is further configured to decrypt the encrypted preset value by using the transmission key to obtain the preset value, and save the preset value; or, the first terminal is further configured to generate the preset value, and encrypt the preset value by using the transmission key, and transmit the encrypted preset value to the second terminal; the second terminal is further configured to decrypt the encrypted preset value by using the transmission key to obtain the preset value, and save the preset value.

As an alternative implementation of the present disclosure, the first terminal is further configured to perform mutual identity authentication with the second terminal before the first terminal starts timing from the time point when finishing transmitting the first data.

The second terminal is further configured to generate the preset value after the mutual identity authentication is passed, and encrypt the preset value by using the public key of the first terminal, and transmits the encrypted preset value to the first terminal; the first terminal is further configured to decrypt the encrypted preset value by using the private key of the first terminal to obtain the preset value, and save the preset value;

or, the first terminal is further configured to generate the preset value after the mutual identity authentication is passed, and encrypt the preset value by using the public key of the second terminal, and transmit the encrypted preset value to the second terminal; the second terminal is further configured to decrypt the encrypted preset value by using the private key of the second terminal to obtain the preset value, and save the preset value.

As an alternative implementation of the present disclosure, the first terminal is further configured to generate the preset value before the first terminal transmits the first data to the second terminal; the first data at least further includes the preset value and a tamper-resistant check value calculated based on the preset value; the second terminal is further configured to, after receiving the first data, acquire the preset value and the tamper-resistant check value from the first data, and perform verification on the tamper-resistant check value, and save the preset value after the verification is passed.

As an alternative implementation of the present disclosure, the preset value includes a preset duration; ΔS is a duration required for the first terminal to transmit data to the second terminal when the distance between the first terminal and the second terminal is the maximum communication distance supported by the communication mode adopted by the two terminals; the value obtained by the first terminal from timing being in the valid range of the preset value includes: the duration obtained by the first terminal after finishing transmitting the first data being within the range of [S, S+2ΔS]; the value obtained by the second terminal from timing reaching the preset value includes: the duration obtained by the second terminal after finishing receiving the first data reaching the preset duration; or the preset value includes the preset number of cycles; the first terminal is further configured to keep generating a carrier signal during the entire process of communication between the first terminal and the second terminal; ΔS is the number of cycles generated by the carrier signal passing through the maximum communication distance supported by the communication mode adopted between the first terminal and the second terminal; wherein, the value obtained by the first terminal from timing being in the valid range of the preset value includes: the number of cycles of the carrier signal continuously transmitted by the first terminal to the second terminal after completion of transmitting the first data being within the range of [S, S+2ΔS]; the value obtained by the second terminal reaching the preset value includes: the number of cycles of the carrier signal continuously received by the second terminal after completion of receiving the first data reaching the preset number of cycles; or the preset value includes the preset number of pulses; the first terminal is further configured to keep generating a carrier signal during the entire process of communication between the first terminal and the second terminal; ΔS is the number of pulses generated by the carrier signal passing through the maximum communication distance supported by the communication mode adopted between the first terminal and the second terminal; wherein, the value obtained by the first terminal from timing being in the valid range of the preset value includes: the number of pulses of the carrier signal continuously transmitted by the first terminal to the second terminal after completion of transmitting the first data being within the range of [S, S+2ΔS]; the value obtained by the second terminal from timing reaching the preset value includes: the number of pulses of the carrier signal continuously received by the second terminal after completion of receiving the first data reaching the preset number of pulses; or the preset value includes a preset phase difference; the first terminal is further configured to keep generating a carrier signal during the entire process of communication between the first terminal and the second terminal; ΔS is a phase change value generated by the carrier signal passing through the maximum communication distance supported by the communication mode adopted between the first terminal and the second terminal; wherein, the value obtained by the first terminal from timing being in the valid range of the preset value includes a phase difference between a first phase and a second phase of the carrier signal being within the range of [S, S+2ΔS], in which, the first phase is a phase of the carrier signal at a time point when the first terminal finishes transmitting the first data, the second phase is a phase of the carrier signal at a time point when the first terminal permits to start receiving the second data; the value obtained by the second terminal from timing reaching the preset value includes a phase difference between a third phase and a fourth phase of the carrier signal reaching the preset phase difference, in which, the third phase is a phase of the carrier signal at a time point when the second terminal finishes receiving the first data, the fourth phase is a phase of the carrier signal at a time point when the second terminal starts transmitting the second data.

According to the data communication system provided by embodiments of the present disclosure, by adopting the scheme that the first terminal performs timed receiving data and the second terminal performs timed transmitting data, the first terminal can identify data hijacking from the man-in-middle even when the second data is received at the time T2<FWT, avoiding the user from economic loss without knowing.

Embodiment 3

Figure 7:
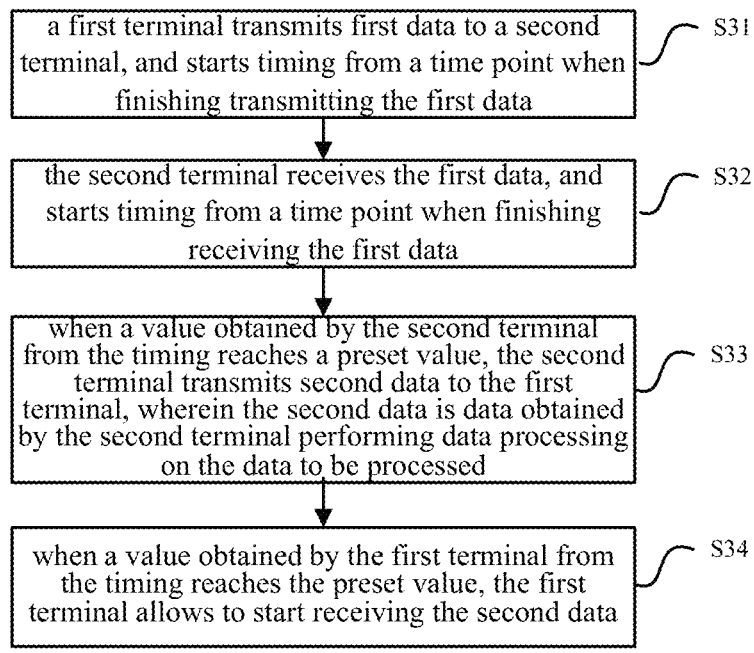
FIG. 7 is a flow chart of a data communication method according to embodiment 3 of the present disclosure.

FIG. 7 is a flow chart of a data communication method according to embodiment 3 of the present disclosure. As illustrated in FIG. 7, the method includes at least steps S31 to S34.

In step S31, a first terminal transmits first data to a second terminal, and starts timing from a time point when finishing transmitting the first data, wherein the first data at least includes data to be processed.

In this embodiment, the communication mode between the first terminal and the second terminal includes a short-range wireless communication mode, and specifically, reference can be made to the corresponding description in step S11 in Embodiment 1.

In the step, as an alternative implementation of the present disclosure, taking the first terminal being a card reader and the second terminal being a smart card as an example, the data to be processed in the first data can be card reading request data. Of course, the data to be processed in the first data is not limited thereto. For example, the first terminal and the second terminal are both mobile terminals, and the data to be processed in the first data can also be request data for requesting the second terminal to return a picture, and the like. This embodiment does not impose excessive restrictions on the data to be processed in the first data, as long as it is the request data initiated by the first terminal to the second terminal.

Based on the problem in the background, in this embodiment, in order to be able to identify data hijacking from a man-in-middle even when T2<FWT, the scheme that the first terminal performs timed receiving data and the second terminal performs timed transmitting data is adopted. Therefore, in this step, the first terminal starts timing from the time point when finishing transmitting the first data, and when the value obtained from timing reaches the preset value, if the data returned by the second terminal is received, it indicates that there is no data hijacking from the man-in-middle, and if not received, the data hijacking from the man-in-middle can be identified.

In step S32, the second terminal receives the first data, and starts timing from a time point when finishing receiving the first data.

In this embodiment, after receiving the first data, the second terminal does not transmit the processed data to the first terminal immediately after the first data processing is completed as in the related art, but start timing, and adopts the scheme that the first terminal performs timed receiving data and the second terminal performs timed transmitting data. When the value obtained by timing reaches a preset value, the second terminal transmits the second data obtained by processing the data to be processed in the first data, i.e. performs timed transmission (refer to step S33), such that the first terminal can identify whether there is a case of data hijacking from the man-in-middle even when the second data is received at the time T2 less than a frame waiting time (FWT).

In step S33, when a value obtained by the second terminal from timing reaches a preset value, the second terminal transmits second data to the first terminal, wherein the second data is data obtained by the second terminal after performing data processing on the data to be processed in the first data.

In this embodiment, the second data is not limited, and specifically, reference can be made to the corresponding description in step S13 in Embodiment 1.

In step 34, when a value obtained by the first terminal from timing reaches the preset value, the first terminal is permitted to start receiving the second data.

In this embodiment, as mentioned above, the communication mode adopted between the first terminal and the second terminal may be short-range wireless communication, and may include multiple communication modes. Moreover, the maximum communication distance supported by each communication manner is different, for example, the working frequency of NFC is 13.56 MHz, and the supported communication distance is within 20 cm, while the working frequency of Bluetooth is 2.4 GHz, and the supported communication distance can reach 20 m, and WiFi can reach 100 m. The maximum communication distance supported by short-range wireless communication is within a few hundred meters, on the basis of this, the transmission time of data between two terminals is at ns level, and the preset value is at least greater than the time for data processing of the data to be processed by the second terminal (ms level). Therefore, since the data transmission time between the two terminals is very small compared to the preset value, in the present embodiment, the transmission time of the data is negligible.

It should be noted that the first data is continuously transmitted to the second terminal in a byte manner, and the first terminal continuously transmits the first byte, the second byte, . . . the last byte of the first data, the second terminal continuously receives the first byte, the second byte, . . . the last byte of the first data. Since the short-range communication mode is adopted between the first terminal and the second terminal, during the process in which the first terminal starts to transmit respective bytes of the first data, the second terminal has begun to receive respective bytes of the first data. Considering that the duration in which the terminal receives a single byte is in a small order of magnitude, which can be ignored, when the first byte of the first data arrives at the second terminal, the last byte of the first data has not been transmitted yet, that is, the first terminal has not finished transmitting the first data. Without considering the transmission time on the line, we can think that the first terminal transmits the first data simultaneously when the second terminal receives the first data, that is, the time at which the first terminal finishes transmitting the first data is the time at which the second terminal finishes receiving the first data. Therefore, in step S31, the timing starts at the time point when the first terminal finishes transmitting the first data, and in step S32, the timing starts at the time point when the second terminal finishes receiving the first data. Without considering the transmission time on the line, and without the data hijacking from the man-in-middle, the first terminal should be able to receive the second data when the value obtained by timing reaches the preset value.

Based on the problems existing in the existing smart card communication protocol proposed in the background, the present embodiment provides a data communication method. The data communication method avoids the problems in the related art through the scheme that the second terminal performs timed transmitting data (transmits data when the value obtained by timing reaches the preset value) and the first terminal performs timed receiving data returned by the second terminal (receives data when the value obtained by timing reaches the preset value). The first terminal can be a merchant card reader in the background, and the second terminal can be a user smart card in the background. The first terminal is only permitted to receive the data returned by the second terminal when the value obtained by the first terminal from timing reaches the preset value, and not permitted to receive the data returned by the second terminal at any value other than the preset value (for example, when the preset value is not reached or exceeded). Therefore, if the first terminal is permitted to start receiving and receives the second data when the value obtained by the first terminal from timing reaches the preset value, it indicates that there is no data hijacking from the man-in-middle. However, if the first terminal is permitted to start receiving but does not receive the second data when the value obtained by the first terminal from timing reaches the preset value, it indicates that there is a data hijacking from the man-in-middle. In this embodiment, the duration corresponding to the preset value S is less than or equal to a frame waiting time FWT specified by the communication protocol adopted by the first terminal and the second terminal, for example, a frame waiting time FWT specified by protocols ISO14443 and ISO15693, such that the first terminal (i.e. the card reader) will wait for the smart card to return data within the frame waiting time while implementing the timing reception scheme provided in this embodiment. Therefore, the method provided by this embodiment can identify data hijacking from the man-in-middle while being compatible with the existing protocols. In the case of hijacking from the man-in-middle, taking the preset value S as the preset duration as an example (the duration required to transmit data back and forth between the two terminals is neglected), since the second terminal transmits the data when the value obtained by the second terminal from timing reaches S, $T2=s1+s2+S$, where T2 is the time required for the first terminal from finishing transmitting the first data to receiving the data fed back by the second terminal, and $s1+s2$ is the time required for the man-in-middle to perform the tampering process (reference may be made to tw1 and tw2 in the background, in which tw1 corresponds to s1 and tw2 corresponds to s2), and the time T2 exceeds the preset value even if T2<FWT, such that the first terminal refuses to receive the data returned by the second terminal, and interrupts communication with the second terminal. Therefore, the first terminal can identify data hijacking from the man-in-middle even if T2<FWT. It should be noted that, in this embodiment, the preset value S may include various forms in addition to representing the duration. Here, for the sake of easy understanding, the duration is merely illustrative. In this embodiment, various forms included by the preset value S may be mentioned, and are specifically described below.

In this embodiment, the preset value S may be pre-stored in the fixed area of the terminal before the terminal leaves the factory without negotiation, or may be obtained by the first terminal and the second terminal through negotiation, or may be generated by one party and transmitted to the other party, or may be written by the first terminal in a data packet specified by the protocol, and transmitted to the second terminal together when the first terminal transmits data to the second terminal. The preset value is crucial for identifying data hijacking from the man-in-middle. Therefore, in order to prevent the preset value from being tampered with, the present embodiment provides several methods for obtaining the preset value. For details, reference can be made to the detailed description of several methods for obtaining the preset value in Embodiment 1.

In addition, in this embodiment, as an alternative implementation, the preset value may include at least: a preset duration, a preset number of cycles, a preset number of pulses, or a preset phase difference. Therefore, in this embodiment, the first terminal and the second terminal accordingly have different methods of timing, and different methods of determining whether the value obtained by timing reaches the preset value. Detailed description will be made with respect to various preset values.

As an alternative implementation of the present embodiment, the preset value may include a preset duration, where the preset duration is greater than the duration in which the second terminal perform data processing on the data to be processed in the received first data (since the second terminal needs to transmit the second data after data processing when the value obtained by timing reaches the preset value). In addition, optionally, the preset duration can be less than or equal to FWT. In step S34, the value obtained by the first terminal from timing reaching the preset value includes the duration obtained by the first terminal after completing transmitting the first data reaching the preset duration; in step 33, the value obtained by the second terminal from timing reaching the preset value includes the duration obtained by the second terminal after completing receiving the first data reaching the preset duration.

In this alternative implementation, both the first terminal and the second terminal have a timer, which supports the precise timing function, and can determine whether it reaches the preset duration or whether it is in a valid range of the preset duration according to the duration obtained by the timer. For example, the second terminal may be a smart card with a crystal oscillator, and the smart card with the crystal oscillator can count the timing by the duration counted by its internal clock, and the timing accuracy is determined by the clock accuracy of the smart card. For example, $S=5\times10^{-3}$ s, in the case of Bluetooth, the second terminal transmits the second data when the timing reaches $5\times10^{-3}$ s, and the first terminal only permits to start receiving the second data when the timing reaches $5\times10^{-3}$ s. Further, only when the second data is received when the timing reaches $5\times10^{-3}$ s, it indicates that there is no data hijacking from the man-in-middle. Therefore, the data hijacking from the man-in-middle can be identified. Although the alternative implementation is exemplified only by Bluetooth communication, other short-range communication modes are within the protection scope of the present disclosure.

For a passive, crystal-free terminal (such as a smart card), the terminal has no timing function, and in this embodiment, the first terminal always generates a carrier signal during the entire process of communication between the first terminal and the second terminal. Therefore, in this embodiment, a timing method different from the clock timing is proposed. In this embodiment, the value can also be counted by calculating the number of cycles, the number of pulses, and the phase difference of the carrier signal. The preset value may specifically include the number of cycles of the preset carrier signal, the number of pulses of the preset carrier signal, and the phase difference of the preset carrier signal.

The duration corresponding to the number of cycles of the preset carrier signal, corresponding to the number of pulses of the preset carrier signal, or corresponding to the phase difference of the preset carrier signal is greater than the duration in which the second terminal performs data processing on the data to be processed in the received first data. In addition, optionally, each of the duration corresponding to the number of cycles of the preset carrier signal, the duration corresponding to the number of pulses of the preset carrier signal, and the duration corresponding to the phase difference of the preset carrier signal may be less than or equal to FWT. As an alternative implementation, the preset value may include the preset number of cycles; in step S34, the value obtained by the first terminal from timing reaching the preset value includes the number of cycles of the carrier signal continuously transmitted by the first terminal to the second terminal after completing transmitting the first data reaching the preset number of cycles; in step 33, the value obtained by the second terminal from timing reaching the preset value includes the number of cycles of the carrier signal continuously received by the second terminal after completing receiving the first data reaches the preset number of cycles.

In this embodiment, the first terminal is always generating the carrier signal. When the first terminal needs to transmit data, for example, the first terminal transmits the first data by modulating the first data on the carrier signal and transmitting the carrier signal to the second terminal. When the first terminal does not need to transmit data, the first terminal transmits the carrier signal to the second terminal, and the carrier signal does not carry data. In the alternative implementation, the first terminal and the second terminal both have a counter, and can calculate the number of cycles of the carrier signal in the foregoing situation. The alternative implementation provides an alternative way of counting the value. The first terminal and the second terminal can achieve accurate timing without using a clock timing. For example, in the case of terminals supporting the NFC communication mode, the operating frequency of the first terminal and the second terminal is 13.56 MHz. During the communication between the first terminal and the second terminal, the first terminal (such as a card reader) keeps generating a carrier of 13.56 MHz, and the time period T of the carrier is fixed, i.e., T=1/13.56 MHz, which is approximately equal to 74 ns. A unit of the value obtained by counting timing in cycles can be accurate to ns, thereby achieving accurate statistics effect. Moreover, the alternative implementation can be applied to a passive card without a crystal oscillator. Although this alternative implementation is exemplified only by NFC communication, other short-range communication modes are within the protection scope of the present disclosure.

In addition, as another alternative implementation of the present embodiment, the preset value may include the preset number of pulses; in step S34, the value obtained by the first terminal from timing reaching the preset value includes the number of pulses of the carrier signal continuously transmitted by the first terminal to the second terminal after completing transmitting the first data reaching the preset number of pulses; in step 33, the value obtained by the second terminal from timing reaching the preset value includes the number of pulses of the carrier signal continuously received by the second terminal after completing receiving the first data reaching the preset number of pulses.

Compared with the above method of counting the number of cycles of the carrier signal, counting the number of pulses of the carrier signal, i.e. counting the number of peaks of the carrier signal, can achieve the effect of further accurate counting. Furthermore, this alternative implementation can be applied to passive, crystalless smart cards.

In addition, as another alternative implementation of the present embodiment, the preset value may include preset phase difference; in step S34, the value obtained by the first terminal from timing reaching the preset value includes the phase difference between a first phase and a second phase of the carrier signal reaching the preset phase difference, wherein, the first phase is a phase of the carrier signal at a time point when the first terminal finishes transmitting the first data, and the second phase is a phase of the carrier signal at a time point when the first terminal permits to start receiving the second data; in step 33, the value obtained by the second terminal from timing reaching the preset value includes the phase difference between a third phase and a fourth phase of the carrier signal reaching the preset phase difference, wherein, the third phase is a phase of the carrier signal at a time point when the second terminal finishes receiving the first data, and the fourth phase is a phase of the carrier signal at a time point when the second terminal starts transmitting the second data.

For example, the first terminal and the second terminal can negotiate or generate by one party the preset phase difference $S=(½+40)\pi$ by using the previously mentioned method of obtaining the preset value. Taking the first terminal being a card reader and the second terminal being a smart card as an example, after the card reader finishes transmitting the first data and after the smart card finishes receiving the first data, the communication waveform between the two is a standard sine wave carrier, and the phase at this moment is recorded as 0 (i.e., the first phase and the third phase are 0). When the carrier phase difference (i.e., the phase difference between the third phase and the fourth phase) reaches $(½+40)\pi$, the smart card transmits the second data. At this time, the card reader is permitted to start receiving only when the phase difference obtained by the timing reaches $(½+40)\pi$, and only when the second data is received, it indicates that there is no data hijacking from the man-in-middle only when the second data. In this way, the data hijacking from the man-in-middle can be identified.

In this alternative implementation, the terminals supporting the NFC communication mode are taken as an example, in which the operating frequency of the first terminal and the second terminal is 13.56 MHz. During the communication between the first terminal and the second terminal, the first terminal (such as a card reader) keeps generating a carrier of 13.56 MHz, and the time period of the carrier is fixed, i.e., $T=1/13.56$ MHz, which is approximately equal to 74 ns. The phase can be dividing one period in a degree of $2\pi$. The unit can be accurate to $74/2\pi$ ns when the timing is counted by phase. Compared with the above-mentioned method of counting the number of cycles and the number of pulses of the carrier signal, counting the phase difference can achieve further accurate statistics effect. Moreover, the alternative implementation can be applied to passive, crystalless smart cards. Although this alternative implementation is exemplified only by NFC communication, other short-range communication modes are within the protection scope of the present disclosure.

According to the data communication method provided by embodiments of the present disclosure, by adopting the scheme that the first terminal performs timed receiving data and the second terminal performs timed transmitting data, the first terminal can identify data hijacking from the man-in-middle even when the second data is received at the time T2 less than the frame waiting time (FWT), avoiding the user from economic loss without knowing.

Embodiment 4

Based on the same inventive concept, an embodiment of the present disclosure further provides a data communication system. As illustrated in FIG. 6, the data communication system includes a first terminal and a second terminal, and the first terminal and the second terminal perform the data communication method as in Embodiment 3.

The first terminal is configured to transmit the first data to the second terminal, and start timing from a time point when finishing transmitting the first data, wherein the first data includes data to be processed. The second terminal is configured to receive the first data, and start timing from a time point when finishing receiving the first data. The second terminal is further configured to transmit the second data to the first terminal when a value obtained by the second terminal from timing reaches a preset value, wherein the second data is data obtained by the second terminal after performing data processing on the data to be processed. The first terminal is further configured to permit to start receiving the second data, when a value obtained by the first terminal from timing reaches the preset value.

As an alternative implementation, the communication mode adopted between the first terminal and the second terminal includes a short-range wireless communication mode.

As an alternative implementation, the first terminal is further configured to perform mutual identity authentication with the second terminal before the first terminal starts timing from the time point when finishing transmitting the first data, and to negotiate with the second terminal to obtain a transmission key after the mutual identity authentication is passed.

The second terminal is further configured to generate the preset value, and encrypt the preset value by using the transmission key, and transmit the encrypted preset value to the first terminal; the first terminal is further configured to decrypt the encrypted preset value by using the transmission key to obtain the preset value, and save the preset value; or, the first terminal is further configured to generate the preset value, and encrypt the preset value by using the transmission key, and transmit the encrypted preset value to the second terminal; the second terminal is further configured to decrypt the encrypted preset value by using the transmission key to obtain the preset value, and save the preset value.

As an alternative implementation, the first terminal is further configured to perform mutual identity authentication with the second terminal before the first terminal starts timing from the time point when finishing transmitting the first data.

The second terminal is further configured to generate the preset value after the mutual identity authentication is passed, and encrypt the preset value by using the public key of the first terminal, and transmits the encrypted preset value to the first terminal; the first terminal is further configured to decrypt the encrypted preset value by using the private key of the first terminal to obtain the preset value, and save the preset value;

or, the first terminal is further configured to generate the preset value after the mutual identity authentication is passed, and encrypt the preset value by using the public key of the second terminal, and transmit the encrypted preset value to the second terminal; the second terminal is further configured to decrypt the encrypted preset value by using the private key of the second terminal to obtain the preset value, and save the preset value.

As an alternative implementation, the first terminal is further configured to generate the preset value before the first terminal transmits the first data to the second terminal; the first data at least further includes the preset value and the tamper-resistant check value calculated based on the preset value.

The second terminal is further configured to, after receiving the first data, acquire the preset value and the tamper-resistant check value from the first data, and perform verification on the tamper-resistant check value, and save the preset value after the verification is passed.

As an alternative implementation, the preset value includes a preset duration, in which the preset duration is less than or equal to a frame waiting time (FWT) specified by the communication protocol adopted by the first terminal and the second terminal.

The value obtained by the first terminal from timing reaching the preset value includes: the duration obtained by the first terminal from timing after finishing transmitting the first data reaching the preset duration.

The value obtained by the second terminal from timing reaching the preset value includes: the duration obtained by the second terminal from timing after finishing receiving the first data reaching the preset duration.

As an alternative implementation, the first terminal is further configured to keep generating a carrier signal during the entire process of communication between the first terminal and the second terminal.

The preset value includes a preset number of cycles, in which the duration corresponding to the preset number of cycles is less than or equal to the FWT specified by the communication protocol adopted by the first terminal and the second terminal; the value obtained by the first terminal from timing reaching the preset value includes: the number of cycles of the carrier signal continuously transmitted by the first terminal to the second terminal after completing transmitting the first data reaching the preset number of cycles; the value obtained by the second terminal from timing reaching the preset value includes: the number of cycles of the carrier signal continuously received by the second terminal after completing receiving the first data reaching the preset number of cycles, or the preset value includes a preset number of pulses, in which the duration corresponding to the preset number of cycles is less than or equal to the FWT specified by the communication protocol adopted by the first terminal and the second terminal; the value obtained by the first terminal from timing reaching the preset value includes: the number of pulses of the carrier signal continuously transmitted by the first terminal to the second terminal after completing transmitting the first data reaching the preset number of pulses; the value obtained by the second terminal from timing reaching the preset value includes: the number of pulses of the carrier signal continuously received by the second terminal after completing receiving the first data reaching the preset number of pulses, or the preset value includes a preset phase difference, in which the duration corresponding to the preset phase difference is less than or equal to the FWT specified by the communication protocol adopted by the first terminal and the second terminal; the value obtained by the first terminal from timing reaching the preset value includes: a phase difference between a first phase and a second phase of the carrier signal reaching the preset phase difference, wherein, the first phase is a phase of the carrier signal at a time point when the first terminal finishes transmitting the first data, and the second phase is a phase of the carrier signal at a time point when the first terminal permits to start receiving the second data; the value obtained by the second terminal from timing reaching the preset value includes: a phase difference between a third phase and a fourth phase of the carrier signal reaching the preset phase difference, wherein, the third phase is a phase of the carrier signal at a time point when the second terminal finishes receiving the first data, and the fourth phase is a phase of the carrier signal at a time point when the second terminal starts transmitting the second data.

According to the data communication system provided by embodiments of the present disclosure, by adopting the scheme that the first terminal performs timed receiving data and the second terminal performs timed transmitting data, the first terminal can identify data hijacking from the man-in-middle even when the second data is received at the time T2 less than the frame waiting time (FWT), avoiding the user from economic loss without knowing.

Any procedure or method described in the flow charts or described in any other way herein may be understood include one or more modules, portions or parts for executing instruction codes that implement specific steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an Application Specific Integrated Circuit having appropriate combinational logic gates, a Programmable Gate Array(s) (PGA), a Field Programmable Gate Array (FPGA), etc.

The common technical personnel in the field may understand that all or some steps in the above embodiments may be completed by the means that relevant hardware is instructed by a program. The programs may be stored in a computer readable storage medium, and the programs include any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a ROM, a magnetic disk or a disk and the like.

In the description of the present disclosure, reference throughout this specification to "an embodiment," "some embodiments," "an example," "a specific example," or "some examples," means that a particular feature, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, or characteristics may be combined in any suitable manner in one or more embodiments or examples.

Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure. The scope of the present disclosure is limited by claims and their equivalents.

What is claimed is:

1. A data communication system, comprising a first terminal and a second terminal, wherein
the first terminal comprises a first processor and a first memory having a first instruction stored thereon, and the first terminal is configured to transmit first data to the second terminal, and start timing from a time point when finishing transmitting the first data, wherein the first data comprises at least data to be processed;
the second terminal comprises a second processor and a second memory having a second instruction stored thereon, and the second terminal is configured to receive the first data, and start timing from a time point when finishing receiving the first data;
the second terminal is further configured to transmit second data to the first terminal when a value obtained by the second terminal from the timing reaches a preset value, wherein the second data is data obtained after the second terminal performs data processing on the data to be processed;
the first terminal is further configured to allow to start receiving the second data when a value obtained by the first terminal from the timing is within a valid range of the preset value;
the preset value comprises a preset phase difference; the first terminal keeps generating a carrier signal during the entire process of communication between the first terminal and the second terminal; ΔS is a phase change value generated by the carrier signal passing through the maximum communication distance supported by the communication mode adopted between the first terminal and the second terminal;
wherein the value obtained by the first terminal being in the valid range of the preset value comprises a phase difference between a first phase and a second phase of the carrier signal being within the range of [S, S+2ΔS], in which the first phase is a phase of the carrier signal at a time point when the first terminal finishes transmitting the first data, the second phase is a phase of the carrier signal at a time point when the first terminal allows to start receiving the second data; the value obtained by the second terminal reaching the preset value comprises a phase difference between a third phase and a fourth phase of the carrier signal reaching the preset phase difference, in which the third phase is a phase of the carrier signal at a time point when the second terminal finishes receiving the first data, the fourth phase is a phase of the carrier signal at a time point when the second terminal starts transmitting the second data.

2. A data communication method, comprising:
a first terminal transmitting first data to a second terminal, and starting timing from a time point when finishing transmitting the first data, wherein the first data comprises at least data to be processed;
the second terminal receiving the first data, and starting timing from a time point when finishing receiving the first data;
the second terminal transmitting second data to the first terminal when a value obtained by the second terminal from the timing reaches a preset value, wherein the second data is data obtained after the second terminal performs data processing on the data to be processed;
the first terminal allowing to start receiving the second data when a value obtained by the first terminal from the timing reaches the preset value;
the preset value comprises a preset phase difference, the duration corresponding to the preset phase difference being less than or equal to the FWT specified in the communication protocol adopted by the first terminal and the second terminal; wherein the value obtained by the first terminal reaching the preset value comprises a phase difference between a first phase and a second phase of the carrier signal reaching the preset phase difference, in which the first phase is a phase of the carrier signal at a time point when the first terminal finishes transmitting the first data, the second phase is a phase of the carrier signal at a time point when the first terminal allows to start receiving the second data; the value obtained by the second terminal reaching the preset value comprises a phase difference between a third phase and a fourth phase of the carrier signal reaching the preset phase difference, in which the third phase is a phase of the carrier signal at a time point when the second terminal finishes receiving the first data, the fourth phase is a phase of the carrier signal at a time point when the second terminal starts transmitting the second data.

3. The method according to claim 2, wherein:
a communication mode adopted between the first terminal and the second terminal comprises a short-range wireless communication mode.

4. The method according to claim 2, wherein,
before the first terminal starts timing from the time point when finishing transmitting the first data, the method further comprises:
the first terminal and the second terminal performing mutual identity authentication, and after passing the mutual identity authentication, the first terminal and the second terminal negotiating with each other to obtain a transmission key; the second terminal generating the preset value, and encrypting the preset value by using the transmission key, and transmitting encrypted preset value to the first terminal, and the first terminal decrypting the encrypted preset value by using the transmission key to obtain the preset value, and saving the preset value; or the first terminal generating the preset value, and encrypting the preset value by using the transmission key, and transmitting encrypted preset value to the second terminal, and the second terminal decrypting the encrypted preset value by using the transmission key to obtain the preset value, and saving the preset value; or, the first terminal and the second terminal performing mutual identity authentication; after passing the mutual identity authentication, the second terminal generating the preset value, and encrypting the preset value by using a public key of the first terminal, and transmitting the encrypted preset value to the first terminal, and the first terminal decrypting the encrypted preset value by using a private key of first terminal to obtain the preset value, and saving the preset value; or, after passing the mutual identity authentication, the first terminal generating the preset value, and encrypting the preset value by using a public key of the second terminal, and transmitting the encrypted preset value to the second terminal, and the second terminal decrypting the encrypted preset value by using a private key of the second terminal to obtain the preset value, and saving the preset value.

5. The method according to claim 2, wherein, before the first terminal transmits the first data to the second terminal, the method further comprises: the first terminal generating the preset value; the first data at least further comprises the preset value and a tamper-resistant check value calculated based on the preset value; after the second terminal receives the first data, the method further comprises: the second terminal acquiring the preset value and the tamper-resistant check value from the first data, and verifying the tamper-resistant check value, and saving the preset value after the verification is passed.

6. The method according to claim 2, wherein, the preset value comprises a preset duration, the preset duration being less than or equal to a frame waiting time FWT specified in the communication protocol adopted by the first terminal and the second terminal; the value obtained by the first terminal from the timing reaching the preset value comprises a duration obtained by the first terminal from finishing transmitting the first data reaching the preset duration; the value obtained by the second terminal reaching the preset value comprises a duration obtained by the second terminal from finishing receiving the first data reaching the preset duration.

7. The method according to claim 2, wherein, the first terminal keeps generating a carrier signal during an entire process of communication between the first terminal and the second terminal; the preset value comprises a preset number of cycles, a duration corresponding to the preset number of cycles being less than or equal to the FWT specified in the communication protocol adopted by the first terminal and the second terminal; wherein the value obtained by the first terminal reaching the preset value comprises the number of cycles of the carrier signal continuously transmitted by the first terminal to the second terminal after completion of transmitting the first data reaching the preset number of cycles; the value obtained by the second terminal reaching the preset value comprises the number of cycles of the carrier signal continuously received by the second terminal after completion of receiving the first data reaching the preset number of cycles; or the preset value comprises a preset number of pulses, the duration corresponding to the preset number of pulses being less than or equal to the FWT specified in the communication protocol adopted by the first terminal and the second terminal; wherein the value obtained by the first terminal reaching the preset value comprises the number of pulses of the carrier signal continuously transmitted by the first terminal to the second terminal after completion of transmitting the first data reaching the preset number of pulses; the value obtained by the second terminal reaching the preset value comprises the number of pulses of the carrier signal continuously received by the second terminal after completion of receiving the first data reaching the preset number of pulses.

8. A data communication system, comprising a first terminal and a second terminal, wherein
the first terminal comprises a first processor and a first memory having a first instruction stored thereon, and the first terminal is configured to transmit first data to the second terminal, and start timing from a time point when finishing transmitting the first data, wherein the first data comprises at least data to be processed;
the second terminal comprises a second processor and a second memory having a second instruction stored thereon, and the second terminal is configured to receive the first data, and start timing from a time point when finishing receiving the first data;
the second terminal is further configured to transmit second data to the first terminal when a value obtained by the second terminal from the timing reaches a preset value, wherein the second data is data obtained after the second terminal performs data processing on the data to be processed;
the first terminal is further configured to allow to start receiving the second data when a value obtained by the first terminal from the timing reaches the preset value;
the preset value comprises a preset phase difference, the duration corresponding to the preset phase difference being less than or equal to the FWT specified in the communication protocol adopted by the first terminal and the second terminal; wherein the value obtained by the first terminal reaching the preset value comprises a phase difference between a first phase and a second phase of the carrier signal reaching the preset phase difference, in which the first phase is a phase of the carrier signal at a time point when the first terminal finishes transmitting the first data, the second phase is a phase of the carrier signal at a time point when the first terminal allows to start receiving the second data; the value obtained by the second terminal reaching the preset value comprises a phase difference between a third phase and a fourth phase of the carrier signal reaching the preset phase difference, in which the third phase is a phase of the carrier signal at a time point when the second terminal finishes receiving the first data, the fourth phase is a phase of the carrier signal at a time point when the second terminal starts transmitting the second data.

9. The data communication system according to claim 8, wherein a communication mode adopted between the first terminal and the second terminal comprises a short-range wireless communication mode.

10. The data communication system according to claim 8, wherein
before the first terminal starts timing from the time point when finishing transmitting the first data,
the first terminal and the second terminal are further configured to perform mutual identity authentication, and after passing the mutual identity authentication, negotiate with each other to obtain a transmission key; the second terminal is further configured to generate the preset value, and encrypt the preset value by using the transmission key, and transmit encrypted preset value to the first terminal, and the first terminal is further configured to decrypt the encrypted preset value by using the transmission key to obtain the preset value, and save the preset value; or the first terminal is further configured to generate the preset value, and encrypt the preset value by using the transmission key, and transmit encrypted preset value to the second terminal, and the second terminal is further configured to decrypt the encrypted preset value by using the transmission key to obtain the preset value, and save the preset value; or, the first terminal and the second terminal are further configured to perform mutual identity authentication; after passing the mutual identity authentication, the second terminal is further configured to generate the preset value, and encrypt the preset value by using a public key of the first terminal, and transmit the encrypted preset value to the first terminal, and the first terminal is further configured to decrypt the encrypted preset value by using a private key of first terminal to obtain the preset value, and save the preset value; or, after passing the mutual identity authentication, the first terminal is further configured to generate the preset value, and encrypt the preset value by using a public key of the second terminal, and transmit the encrypted preset value to the second terminal, and the second terminal is further configured to decrypt the encrypted preset value by using a private key of the second terminal to obtain the preset value, and save the preset value.

11. The data communication system according to claim 8, wherein,
before the first terminal transmits the first data to the second terminal, the first terminal is further configured to generate the preset value;
the first data at least further comprises the preset value and a tamper-resistant check value calculated based on the preset value;
after the second terminal receives the first data, the second terminal is further configured to acquire the preset value and the tamper-resistant check value from the first data, and verify the tamper-resistant check value, and save the preset value after the verification is passed.

12. The data communication system according to claim 8, wherein,
the preset value comprises a preset duration, the preset duration being less than or equal to a frame waiting time FWT specified in the communication protocol adopted by the first terminal and the second terminal;
the value obtained by the first terminal from the timing reaching the preset value comprises a duration obtained by the first terminal from finishing transmitting the first data reaching the preset duration;
the value obtained by the second terminal reaching the preset value comprises a duration obtained by the second terminal from finishing receiving the first data reaching the preset duration.

13. The data communication system according to claim 8, wherein,
the first terminal is further configured to keep generating a carrier signal during an entire process of communication between the first terminal and the second terminal;
the preset value comprises a preset number of cycles, a duration corresponding to the preset number of cycles being less than or equal to the FWT specified in the communication protocol adopted by the first terminal and the second terminal; wherein the value obtained by the first terminal reaching the preset value comprises the number of cycles of the carrier signal continuously transmitted by the first terminal to the second terminal after completion of transmitting the first data reaching the preset number of cycles; the value obtained by the second terminal reaching the preset value comprises the number of cycles of the carrier signal continuously received by the second terminal after completion of receiving the first data reaching the preset number of cycles; or the preset value comprises a preset number of pulses, the duration corresponding to the preset number of pulses being less than or equal to the FWT specified in the communication protocol adopted by the first terminal and the second terminal; wherein the value obtained by the first terminal reaching the preset value comprises the number of pulses of the carrier signal continuously transmitted by the first terminal to the second terminal after completion of transmitting the first data reaching the preset number of pulses; the value obtained by the second terminal reaching the preset value comprises the number of pulses of the carrier signal continuously received by the second terminal after completion of receiving the first data reaching the preset number of pulses.

14. The data communication system according to claim 8, wherein the first terminal is a reading device, and the second terminal is a response device.

15. The data communication system according to claim 1, wherein, the valid range of the preset value is [S, S+2ΔS], in which S is the preset value, and ΔS is determined by a maximum communication distance supported by a communication mode adopted between the first terminal and the second terminal, and a duration corresponding to S+2ΔS is less than or equal to a frame waiting time FWT specified in the communication protocol adopted by the first terminal and the second terminal.

16. The data communication system according to claim 1, wherein, the communication mode adopted between the first terminal and the second terminal comprises a short-range wireless communication mode.

17. The data communication system according to claim 1, wherein,
before the first terminal starts timing from the time point when finishing transmitting the first data,
the first terminal and the second terminal are further configured to perform two-way identity authentication, and after passing the two-way identity authentication, negotiate with each other to obtain a transmission key; the second terminal is further configured to generate the preset value, and encrypt the preset value by using the transmission key, and transmit encrypted preset value to the first terminal, and the first terminal is further configured to decrypt the encrypted preset value by using the transmission key to obtain the preset value, and save the preset value; or the first terminal is further configured to generate the preset value, and encrypt the preset value by using the transmission key, and transmit the encrypted preset value to the second terminal, and the second terminal is further configured to decrypt the encrypted preset value by using the transmission key to obtain the preset value, and save the preset value; or, the first terminal and the second terminal are further configured to perform two-way identity authentication; after passing the two-way identity authentication, the second terminal is further configured to generate the preset value, and encrypt the preset value by using a public key of the first terminal, and transmit the encrypted preset value to the first terminal, and the first terminal is further configured to decrypt the encrypted preset value by using a private key of the first terminal to obtain the preset value, and save the preset value; or, after passing the two-way identity authentication, the first terminal is further configured to generate the preset value, and encrypt the preset value by using a public key of the second terminal, and transmit the encrypted preset value to the second terminal, and the second terminal is further configured to decrypt the encrypted preset value by using a private key of the second terminal to obtain the preset value, and save the preset value.

18. The data communication system according to claim 1, wherein,
- before the first terminal transmits the first data to the second terminal, the first terminal is further configured to generate the preset value;
- the first data at least further comprises the preset value and a tamper-resistant check value calculated based on the preset value;
- after the second terminal receives the first data, the second terminal is further configured to acquire the preset value and the tamper-resistant check value from the first data, and verify the tamper-resistant check value, and save the preset value after verification is passed.

19. The data communication system according to claim 1, wherein,
- the preset value comprises a preset duration; $\Delta S$ is the duration required for the first terminal to transmit data to the second terminal when the distance between the first terminal and the second terminal is the maximum communication distance supported by the communication mode adopted by the first terminal and the second terminal; wherein the value obtained by the first terminal being in the valid range of the preset value comprises the duration obtained by the first terminal after completion of transmitting the first data being within the range of [S, S+2$\Delta S$];
- the value obtained by the second terminal reaching the preset value comprises the duration obtained by the second terminal after completion of receiving the first data reaching the preset duration; or
- the preset value comprises a preset number of cycles; the first terminal keeps generating a carrier signal during an entire process of communication between the first terminal and the second terminal; $\Delta S$ is the number of cycles generated by the carrier signal passing through the maximum communication distance supported by the communication mode adopted between the first terminal and the second terminal; wherein the value obtained by the first terminal being in the valid range of the preset value comprises the number of cycles of the carrier signal continuously transmitted by the first terminal to the second terminal after completion of transmitting the first data being within the range of [S, S+2$\Delta S$];
- the value obtained by the second terminal reaching the preset value comprises the number of cycles of the carrier signal continuously received by the second terminal after completion of receiving the first data reaching the preset number of cycles; or
- the preset value comprises a preset number of pulses; the first terminal keeps generating a carrier signal during the entire process of communication between the first terminal and the second terminal; $\Delta S$ is the number of pulses generated by the carrier signal passing through the maximum communication distance supported by the communication mode adopted between the first terminal and the second terminal; wherein the value obtained by the first terminal being in the valid range of the preset value comprises the number of pulses of the carrier signal continuously transmitted by the first terminal to the second terminal after completion of transmitting the first data being within the range of [S, S+2$\Delta S$]; the value obtained by the second terminal reaching the preset value comprises the number of pulses of the carrier signal continuously received by the second terminal after completion of receiving the first data reaching the preset number of pulses.

20. The data communication system according to claim 1, wherein, the first terminal is a reading device, and the second terminal is a response device.

* * * * *